United States Patent
Meyer et al.

(10) Patent No.: US 11,156,477 B2
(45) Date of Patent: Oct. 26, 2021

(54) ROTATION ANGLE MEASUREMENT METHOD AND ROTATION ANGLE MEASURING CIRCUIT

(71) Applicant: TDK-Micronas GmbH, Freiburg (DE)

(72) Inventors: Marcus Christian Meyer, Malsch (DE); Hans Christian Paul Dittmann, Pforzheim (DE)

(73) Assignee: TDK-Micronas GmbH, Freiburg (DE)

( * ) Notice: Subject to any disclaimer, the term of this patent is extended or adjusted under 35 U.S.C. 154(b) by 0 days.

(21) Appl. No.: 17/007,549

(22) Filed: Aug. 31, 2020

(65) Prior Publication Data

US 2021/0063203 A1 Mar. 4, 2021

(30) Foreign Application Priority Data

Aug. 30, 2019 (DE) ...................... 10 2019 006 137.3

(51) Int. Cl.
*G01D 5/14* (2006.01)
*G01D 5/16* (2006.01)

(52) U.S. Cl.
CPC .............. *G01D 5/145* (2013.01); *G01D 5/16* (2013.01)

(58) Field of Classification Search
CPC ........................... G01D 5/12–185; G01B 7/30
See application file for complete search history.

(56) References Cited

U.S. PATENT DOCUMENTS

| | | | |
|---|---|---|---|
| 9,190,948 B2 * | 11/2015 | Blind ...................... | H02P 6/182 |
| 9,470,552 B2 | 10/2016 | Ausserlechner | |
| 9,625,276 B2 | 4/2017 | Ausserlechner | |
| 10,530,222 B2 * | 1/2020 | Kloer ..................... | H02K 5/225 |
| 10,712,404 B2 * | 7/2020 | Uchida .............. | G01D 5/24495 |
| 2014/0225596 A1 * | 8/2014 | Nakamura ............. | G01D 5/145 |
| | | | 324/207.2 |
| 2015/0077093 A1 * | 3/2015 | Saito .................. | G01D 5/24466 |
| | | | 324/207.13 |
| 2018/0022386 A1 * | 1/2018 | Watanabe .......... | B62D 15/0245 |
| | | | 702/151 |

FOREIGN PATENT DOCUMENTS

| | | |
|---|---|---|
| DE | 102015101635 A1 | 8/2015 |
| EP | 3147631 B1 | 10/2019 |

\* cited by examiner

*Primary Examiner* — Huy Q Phan
*Assistant Examiner* — David B Frederiksen
(74) *Attorney, Agent, or Firm* — Muncy, Geissler, Olds & Lowe, P.C.

(57) ABSTRACT

A rotation angle measurement method and a circuit, a rotation angle measuring system including a shaft, a transducer, a first sensor system with at least one magnetic field sensor of a first type for measuring a magnetic field component Bz and a second sensor system with at least one magnetic field sensor of a second type for detecting magnetic field components Bx, By being provided, a first or second measured value being ascertained with the aid of each sensor system at a first point in time, a first or second rotation angle value being determined for each measured value, a first output rotation angle value being determined from the first rotation angle value and a known constant angle offset between the two sensor systems as a reference value for the second sensor system, a deviation of the second rotation angle value from the first output rotation angle value being ascertained.

11 Claims, 2 Drawing Sheets

ROTATION ANGLE MEASUREMENT METHOD AND ROTATION ANGLE MEASURING CIRCUIT

This nonprovisional application claims priority under 35 U.S.C. § 119(a) to German Patent Application No. 10 2019 006 137.3, which was filed in Germany on Aug. 30, 2019, and which is herein incorporated by reference.

BACKGROUND OF THE INVENTION

Field of the Invention

The present invention relates to a rotation angle measurement method and a rotation angle measuring circuit.

Description of the Background Art

Integrated rotation angle determining sensor units are known, in particular, from applications in the area of the motor vehicle. For example, the position of a shaft is determined from the measurement of the magnetic flux with the aid of magnetic field sensors.

In this area, in particular, the safety requirements are especially strict. The requirements are defined by industrial standards, for example ISO 26262. This ISO standard defines, for example, safety levels A through D, so-called Automotive Safety Integrity Levels (ASIL), ASIL A designating the lowest safety level and ASIL D designating the highest safety level, and each safety level defines different requirements.

For example, requirements are a certain redundancy with respect to the measurement method as well as the hardware.

SUMMARY OF THE INVENTION

It is therefore an object of the present invention to provide a rotation angle measurement method for a rotation angle measuring system as well as a rotation angle measuring circuit, which refine the prior art and, in particular, provide a particularly failsafe and yet simple and cost-effective approach.

According to an exemplary embodiment of the invention, a rotation angle measurement method is proposed, a rotation angle measuring system being provided, which includes a shaft, rotatably supported around a rotation axis, and a transducer generating or modifying a magnetic field, a first sensor system being provided, which includes at least one magnetic field sensor of a first type, and a second sensor system being provided, which includes at least one magnetic field sensor of a second type.

The first sensor system detects a first magnetic field component, and the second sensor system detects a second and a third magnetic field component, the first, second and third magnetic field components each running perpendicularly to each other.

Each rotation angle value of the first sensor system ascertained for a rotation angle of the shaft also has a known constant angle offset with respect to the rotation angle of the second sensor system ascertained for the same rotation angle of the shaft.

At least one first measured value is ascertained by the first sensor system, and at least one second measured value is ascertained by the second sensor system at a first point in time, a first rotation angle value being determined for the at least one first measured value, and a second rotation angle value being determined for the at least one second measured value.

A first output rotation angle value is determined from the first rotation angle value and the angle offset as a reference value for the second sensor system, and a deviation of the second rotation angle value from the first output rotation angle value is ascertained.

Either the deviation is minimized by modifying the at least one second measured value and recalculating the second rotation angle value, and a new second rotation angle value is obtained by the minimization, or the at least one modified measured value is output as an end output value, or the deviation is compared with a threshold value and the first output rotation angle value is output as an end output value.

It is understood that the first type and the second type differ from each other, for example with regard to the underlying measurement principle, the two sensor systems each comprising one or even more than one sensor of the particular type.

Each sensor system is also configured to supply one or multiple, for example analog, measured values as the basis for a rotation angle determination. According to the method according to the invention, a rotation angle value is correspondingly ascertained in each case for the same position of the shaft with the aid of differently operating sensors.

However, the constant angle offset between the sensor systems or the angle values determined by the sensor systems for the same rotation angle results due to the arrangement of the sensor systems or the individual sensors.

The angle offset is thus constant, in particular in the case of an integrated design of the two sensor systems in one unit, since the relative arrangement of the sensor systems with respect to each other does not change.

The angle offset is ascertainable, for example, by means of a calibration, preferably at the end of the manufacturing process.

The angle offset describes the ratio or the relative course of the characteristics of the two sensor systems with respect to each other.

The angle offset between the values ascertained with the aid of the first sensor system and the values ascertained with the aid of the second sensor systems is preferably stored as a constant angle value.

Alternatively, a table, a so-called lookup table, may store the variable, i.e. the value of the angle offset for each angle value as a function of the ascertained angle.

In other words, a value of the characteristic of the second sensor system, which takes into account the angle offset, is assigned to each value of the characteristic of the first sensor system.

It is further understood that the aforementioned method steps do not all have to take place in the specified order.

An aspect is that the measured values are detected by the first sensor system and the second sensor system at the same point in time, i.e. within a preferably limited time interval.

The determination of the second rotation angle value, on the other hand, does not have to take place simultaneously or directly after the determination of the first rotation angle value. Instead, according to one specific embodiment, the second rotation angle value is determined only after the determination of the first output rotation angle value.

The first output rotation angle value is determined, for example, by adding the angle offset or with the aid of a table/lookup table.

The first output rotation angle value thus effectively represents an expected rotation angle value for the second sensor system.

The first output rotation angle value is preferably used as a reference value for the second sensor system, it being possible for differences between the reference value ascertained with the aid of the first sensor system and the rotation angle value ascertained with the aid of the second sensor system to result due to different properties of the different types of sensors of the two sensor systems.

A first magnetic field component Bz is preferably detected by the first sensor system, and a second magnetic field component Bx and a third magnetic field component By are preferably detected by the second sensor system.

Magnetic field components Bx, By and Bz run orthogonally to each other.

The two types of sensors have, for example, differences with regard to sensitivity, stray field dependencies, temperature dependencies, a service life drift or also with regard to angle noise.

For example, if the first sensor system is stray field-independent and the second sensor system has a significant stray field dependency of the measured values, the difference between the first output rotation angle value and the second rotation angle value corresponds to the stray field influence.

According to the method, this difference is ascertained as the deviation of the second rotation angle value from the first output rotation angle value.

According to the first alternative specific embodiment, the deviation is used to correct the second rotation angle value before it is output as the end output value, i.e. as the result or the instantaneous rotation angle value. Alternatively, i.e. according to the second alternative specific embodiment, the deviation is used as a control value, the first output rotation angle value based on the first rotation angle value being output as the end output value.

It is understood that the deviation may also be stored as a control value, and a long-term behavior of the two sensor systems may be monitored in this manner.

The correction of the second rotation angle value, i.e. the minimization of the deviation, takes place, for example, by a modification of the present second measured value and a subsequent recalculation of the second rotation angle value, based on the modified measured value. The minimizing method is interrupted according to one refinement after the re-ascertained deviation drops below a deviation threshold value.

The method meets a high safety standard, since two sensor systems including different sensors is used for determining the rotation angle. According to other refinements, the sensor systems and/or the sensors of the sensor systems are additionally each provided with a redundant design for increasing safety, for example in a master/slave configuration.

The use of the second measured value for minimizing the deviation has the advantage that the modification may be easily carried out in an analog component. In particular, analog, modified measured values are then present, which may be particularly easily incorporated into existing system as the end result, i.e. as the end output value.

Each sensor system can include at least two sensors of the particular type, and/or the rotation angle measuring system includes two first sensor systems and two second sensor systems.

The first magnetic field component can run in parallel at an angle of no more than 1° or no more than 0.1° with respect to the rotation axis.

The first type is a Hall sensor, and the first sensor system comprises at least two sensors. Due to the use of at least two Hall sensors, a stray field independence is made possible, the Hall sensors being, for example, horizontal Hall sensors, also referred to as a Hall plate or Z plate. However, the resolution of Hall sensors is typically no better than 0.1°.

The second type can be a magnetoresistive sensor, for example a so-called anisotropic magnetoresistive (AMR) sensor or a giant magnetoresistive (GMR) sensor or a tunnel magnetoresistive (TMR) sensor. In particular, TMR sensors facilitate, for example, a resolution of 0.01° over 360°. It is understood that magnetoresistive sensors usually include four magnetoresistive elements, which are arranged as a Wheatstone bridge, in particular as a full bridge or as a half bridge.

The deviation can be minimized by adapting the second angle value in one step or in multiple steps, i.e. the second rotation angle value is modified only one or also multiple times for the purpose of minimization. The minimization takes place, for example within a control loop (tracking loop), the loop comprising, for example, the steps of modifying the second measured value, recalculating the second rotation angle value and determining the deviation.

The loop is effectively a type of phase control loop (phase-locked loop (PPL)). With the aid of the loop, for example, basic deficiencies of the second sensor system, such as a high dependency of the measured values on stray fields, are compensated for or corrected by accessing the first sensor system, which does not have the deficiency or only to a limited degree. For example, the influence of a stray field may be compensated for in this manner.

A rotation angle measuring circuit can include a first measured value processing unit, a second measured value processing unit and an evaluation unit.

The first measured value processing unit includes at least one input terminal for receiving at least one measured value of a first sensor system, a first rotation angle determining unit for determining a first rotation angle from the at least one measured value of the first sensor system, an output value determining unit for determining a first output rotation angle value, based on the first rotation angle, and a known constant angle offset between the first and the second sensor systems, and an output terminal for outputting the first output rotation angle value.

The second measured value processing unit includes at least one input terminal for receiving at least one measured value of a second sensor system, a first signal processing unit for preparing the at least one measured value, and two output terminals for outputting the two prepared measured values of the second sensor system.

The evaluation unit includes at least two input terminals for receiving the first output rotation angle value from the first measured value processing unit and the at least one prepared measured value of the second sensor system from the second measured value processing unit, at least one output terminal, a rotation angle determining unit, a comparison unit, and a second signal processing unit.

The second signal processing unit can be configured to modify or to leave unmodified the at least one prepared measured value of the second sensor system, taking a deviation into account, and to forward it as at least one further processed measured value to the rotation angle determining unit.

The rotation angle determining unit can be configured to determine a second rotation angle value from the at least one further processed measured value of the second sensor system, and the comparison unit is configured to determine a deviation between the first output rotation angle value and the second rotation angle value and to forward the deviation to the second signal processing unit.

The at least one output terminal of the evaluation unit can be configured to output the second rotation angle value or the at least one further processed measured value of the second sensor system as an end output value. Alternatively, the first measured value processing unit includes another output terminal for outputting the first output rotation angle value as an end output value, and the output terminal of the evaluation unit is configured to output the deviation or a control value ascertained by comparing the deviation with a threshold value.

The type as well as the number of measured values received by the first or second measured value processing unit can depend on the sensor(s) of the particular sensor system. The measured value processing units have a corresponding number of input terminals.

A measured value can be, for example, a voltage output by a sensor, i.e. a voltage present at the input terminal. In addition to a signal portion dependent on the rotation angle or prevailing magnetic field, the measured value may also include additional portions, e.g. an offset.

A wide range of sensor systems and many variations of sensor arrangements are known for determining rotation angles having correspondingly different advantages and disadvantages.

A unit is described here as a sensor system, which comprises at least one sensor and typically a control unit, and which outputs a signal quantity comprising at least one typically analog signal, the signal quantity being sufficient to determine a rotation angle of a shaft.

For example, the first sensor system comprises three horizontal Hall sensors arranged in fixed angle positions on a circle around the rotation axis of the shaft, each Hall sensor detecting a first magnetic field component running in parallel to the rotation axis.

For example, two voltages are output by a control unit of the sensor unit as measured values, each voltage being formed from two of the three Hall voltages of the three sensors. The first sensor system would thus supply two measured values, which are suitable as a basis for determining the rotation angle of the shaft and are stray field-independent.

The second sensor comprises, for example, two magnetoresistive sensors, e.g. two AMR sensors or two TMR sensors or two GMR sensors, the two sensors being arranged, for example, on a circle around the rotation axis of the shaft in positions situated opposite each other, and the one sensor detects a second magnetic field component running perpendicularly to the rotation axis, while the other sensor detects a third magnetic field component running orthogonally to the second component as well as to the rotation axis.

A control unit of the second sensor system correspondingly supplies two voltages, which correspond to the second and third magnetic field components, respectively, and are suitable as the basis for determining a rotation angle.

The preparation of the measured values by the signal processing units comprises, for example, a digitization and/or a calculation of an offset, e.g. an operating voltage, a phase, etc.

The rotation angle measurement method according to the invention may be carried out with the aid of the rotation angle measuring circuit.

The components of the evaluation unit form a loop, which is comparable to a phase control loop (phase-locked loop (PLL)) and effectively permits the control of the second measured values based on the first measured values. The operation carried out during the modification of the measured values effectively corresponds to one rotation around an angle established as a deviation.

The individual components or units are implemented in an analog manner, i.e. with the aid of analog components, and or digitally, i.e. with the aid of software, e.g. on a microcontroller ($\mu C$), which is not specified in greater detail, and/or as an application-specific integrated circuit (ASIC). A high speed may be achieved, in particular by hardware solutions.

It is understood that, in a digital implementation, the typically analog measured values of the sensor systems are first converted with the aid of analog/digital converters, or the circuit includes corresponding converters.

At least the two rotation angle determining units, the output angle determining unit and the comparison unit are preferably designed as software and/or as ASIC(s).

The first and second signal processing units can be either both provided with an analog design or both designed as software and/or ASICs.

In other words, the evaluation unit, in particular, i.e. the control loop, includes both analog and digital components.

It is further noted that the evaluation unit can include additional output terminals for outputting additional values, e.g. the at least one further processed measured value of the second sensor unit and/or the deviation.

The first measured value processing unit can include an analog/digital converter between each input terminal and the first rotation angle determining unit for converting the at least one measured value of the first sensor system into digital signals, the first rotation angle determining unit and the output value determining unit being configured to process digital signals.

The second measured value processing unit can include an analog/digital converter between each input terminal and the first signal processing unit for converting the at least one measured value of the second sensor system into digital signals, the second signal processing unit of the output value determining unit being designed to process digital signals.

The evaluation unit can include at least one analog/digital converter between the second signal processing unit and the second rotation angle determining unit for digitizing the at least one further processed measured value and a digital/analog converter between the comparison unit and the second signal processing unit for converting the deviation into an analog signal, the second rotation angle determining unit and the comparison unit as well as the first measured value processing unit being configured to process digital signals, and the second signal processing unit as well as the first measured value processing unit being configured to process analog signals.

The signal path from the second sensor unit or the corresponding input terminals of the circuit can remain entirely analog up to the second rotation angle determining unit of the evaluation unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
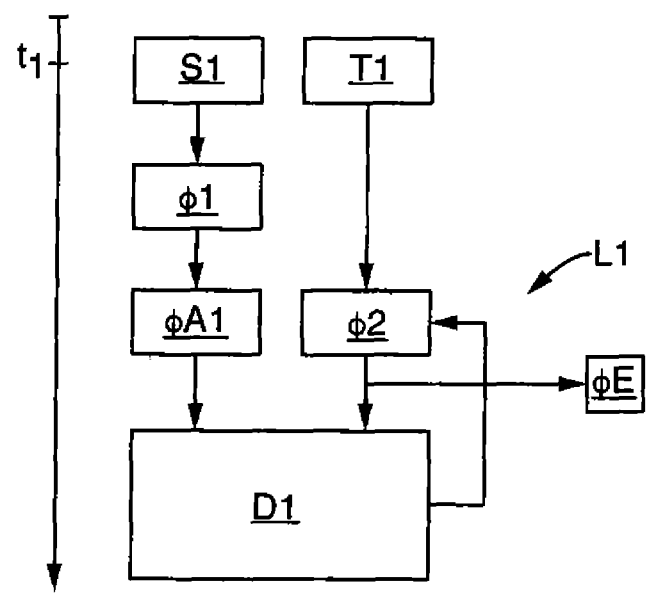
FIG. 1 shows a schematic sequence of an exemplary embodiment according to the invention of a rotation angle measurement method.

The illustration in FIG. 1 shows a sequence of a rotation angle measurement method according to a first specific embodiment according to the invention for determining the rotation angle of a shaft, which is rotatably supported around a rotation axis, with the aid of a transducer, a first sensor system including at least one magnetic field sensor of a first type and a second sensor system including at least one magnetic field sensor of a second type.

A first measured value S1 is ascertained with the aid of a first sensor system, and a second measured value T1 is ascertained with the aid of a second sensor system at a first point in time t1, the first sensor system detecting a first magnetic field component Bz, the second sensor system detecting a second magnetic field component Bx and a third magnetic field component By, and the magnetic field components Bx, By and Bz running orthogonally to each other.

A constant angle offset $\Delta\Phi$, present due to the arrangement of the two sensor systems, between rotation angle values, which are ascertained for the same shaft position with the aid of the two sensor systems, is known.

A first rotation angle value $\Phi 1$ is ascertained for first measured value S1. Based on first rotation angle value $\Phi 1$ and angle offset $\Delta\Phi$, a first output rotation angle value $\Phi A1$ is then determined as a reference value/comparison value for the second sensor system.

In addition, a second rotation angle value $\Phi 2$ is ascertained from second measured value T1 of the second sensor system before, during or after the ascertainment of first rotation angle value $\Phi 1$ and/or the ascertainment of first output rotation angle value $\Phi A1$.

A deviation D1 of second rotation angle value $\Phi 2$ from first output rotation angle value $\Phi A1$ is subsequently ascertained. Deviation D1 is minimized in a loop L2, which is passed through at least once. In loop L1, second rotation angle value $\Phi 2$ is modified on the basis of deviation D1, directly or by modifying the present second measured value T1 and redetermining second rotation angle value $\Phi 2$, and deviation D1 of the now modified second rotation angle value $\Phi 2$ from first output rotation angle value $\Phi A1$ is again determined.

Loop L1 continues to be passed through, for example, until deviation value D1 drops below a threshold value.

In addition, second rotation angle value $\Phi 2$ is output as end output value $\Phi E$.

Figure 2:
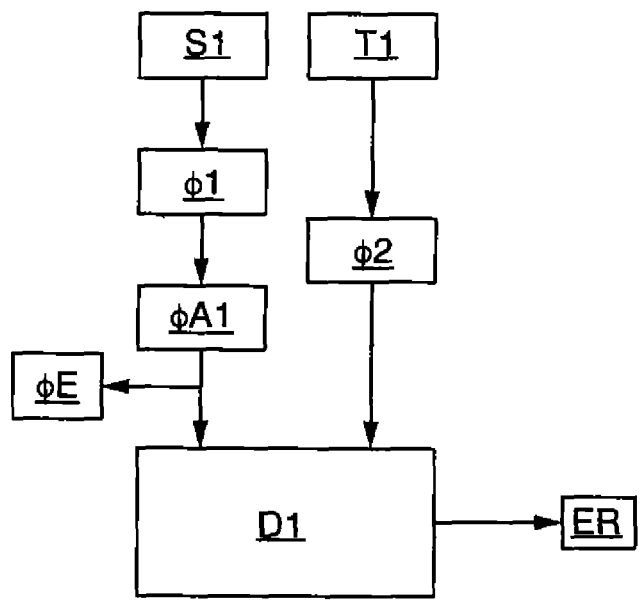
FIG. 2 shows a schematic sequence of an exemplary embodiment according to the invention of a rotation angle measurement method.

A second specific embodiment according to the invention of the rotation angle measurement method is shown in the illustration in FIG. 2. Only the differences from the specific embodiment illustrated in FIG. 1 are explained below.

First output rotation angle value $\Phi A1$ is output as end output value $\Phi E$. Deviation D1 is ascertained but not used in a loop for correcting/optimizing second rotation angle value $\Phi 2$, instead it is only compared with a threshold value for monitoring the two sensor systems, an exceeding of the threshold value being output or indicated with the aid of an error value ER.

Figure 3:
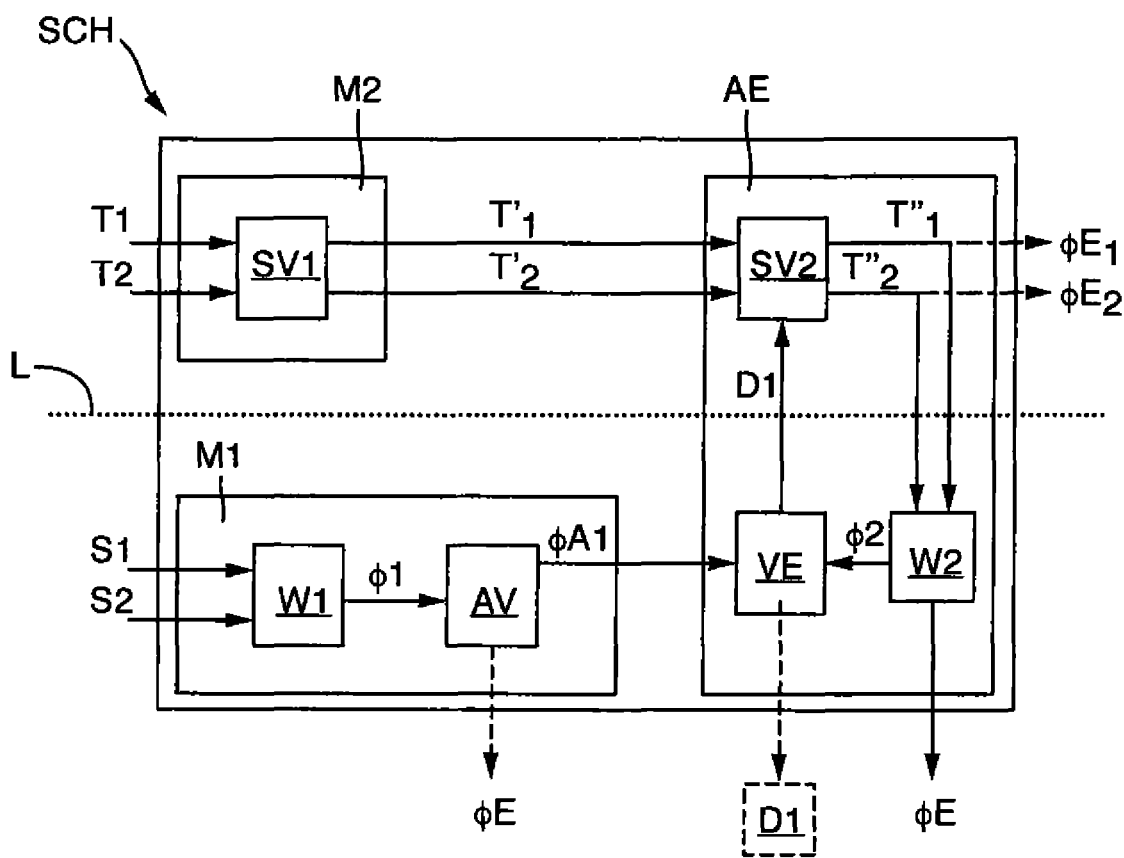
FIG. 3 shows a view of an exemplary embodiment according to the invention of a rotation angle measuring circuit.

A first specific embodiment according to the invention of rotation angle measuring circuit SCH is shown in the illustration in FIG. 3.

Rotation angle measuring circuit SCH includes a first measured value processing unit M1, a second measured value processing unit M2 and an evaluation unit AE.

In the illustrated exemplary embodiment, first measured value processing unit M1 includes two input terminals, a rotation angle determining unit W1, an output value determining unit AU and an output terminal.

The input terminals are configured to be connected to a first sensor unit (not illustrated) for the purpose of receiving two first measuring signals S1 and S2 from the first measuring unit. A first rotation angle value $\Phi 1$ may be determined from the two first measured values S1 and S2 received from the first sensor unit via input terminals with the aid of first rotation angle determining unit W1.

Output value determining unit AU is configured to receive first rotation angle value $\Phi 1$ and to determine a first output rotation angle value $\Phi A1$, based on first rotation angle value $\Phi 1$ and a known constant angle offset 40 between the first and second sensor systems. For example, angle offset 40 or a table with correspondingly converted angle values, a lookup table, is stored for this purpose in output value determining unit AU. The output terminal is configured to output first output rotation angle value $\Phi A1$.

In the illustrated exemplary embodiment, second measured value processing unit M2 includes two input terminals for receiving two measured values T1 and T2 of a second sensor system, a first signal processing unit SV1 and an output terminal. First signal processing unit SV1 is configured to prepare the two measured values T1 and T2 and to output them as prepared measured values T1' and T2' via the output terminal.

Evaluation unit AE is configured to receive the two prepared measured values T1' and T2' from second measured value processing unit M2 via two input terminals and to modify them with the aid of a second signal processing unit SV2, taking into account a deviation D1, or leave them unmodified, and to forward them to a second rotation angle determining unit W2 of evaluation unit AE as further processed measured values T1" and T2".

Second rotation angle determining unit W2 is configured to determining a second rotation angle value $\Phi 2$ from the two further processed measured values T1" and T2" of the second sensor unit and to forward second rotation angle value $\Phi 2$ to a comparison unit VE of evaluation unit AE.

Comparison unit VE is configured to receive first rotation angle value $\Phi 1$ from first measured value processing unit M1 via a further input terminal of evaluation unit AE, to receive second rotation angle value $\Phi 2$ from second rotation angle determining unit W2, to determine the deviation of second rotation angle value $\Phi 2$ from first rotation angle value $\Phi 1$ and to forward the deviation to second signal processing unit SV2.

Evaluation unit AE also includes an output terminal for outputting second rotation angle value $\Phi 2$ as end output value $\Phi E$.

Alternatively (illustrated by the dotted line), first measured value processing unit M1 includes a further output terminal for outputting first output rotation angle ΦA1 or first rotation angle value Φ1, the output terminal of evaluation unit AE being suitable, for example, for outputting deviation D1.

In a further alternative (represented by the dash-dot line), evaluation unit AE includes two output terminals, the output terminals being configured to each output one of the two further processed measured values T1" or T2" of the second sensor unit.

According to a first specific embodiment, all components of rotation angle determining circuit SCH situated above dotted line L have an analog design, and the ones situated below the line have a digital design. Alternatively, for example, all components of rotation angle determining circuit SCH have a digital design. It is understood that rotation angle determining circuit SCH possibly comprise corresponding converters, in particular if measuring signals S1, S2 and/or T1, T2 are analog and/or between digital and analog components.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotation angle measurement method comprising:
   providing a rotation angle measuring system, which includes a shaft that is rotatably supported around a rotation axis, and a transducer generating or modifying a magnetic field;
   providing a first sensor system that includes at least one magnetic field sensor of a first type;
   providing a second sensor system that includes at least one magnetic sensor of a second type;
   detecting, via the first sensor system, a first magnetic field component Bz;
   detecting, via the second sensor system, a second and a third magnetic field component Bx and By, the first, second and third magnetic field components each running perpendicularly to each other;
   ascertaining each rotation angle value of the first sensor system for a rotation angle of the shaft, which has a known constant angle offset with respect to a rotation angle of the second sensor system ascertained for the same rotation angle of the shaft;
   ascertaining at least one first measured value via the first sensor system;
   ascertaining at least one second measured value via the second sensor system at a first point in time;
   determining a first rotation angle value for the at least one second measured value;
   ascertaining a second rotation angle value for the at least one second measured value;
   determining a first output rotation angle value from the first rotation angle value and an angle offset as a reference value for the second sensor system; and
   ascertaining a deviation of the second rotation angle value from the first output rotation angle value,
   wherein either the deviation is minimized by modifying the at least one second measured value and recalculating the second rotation angle value, and a new second rotation angle value obtained by the minimization or the at least one modified second measured value is output as an end output value, or
   wherein the deviation is compared with a threshold value, and the first output rotation angle value is cutout as an end output value.

2. The rotation angle measurement method according to claim 1, wherein each sensor system includes at least two sensors of a particular type.

3. The rotation angle measurement method according to claim 1, wherein the rotation angle measuring system includes two first sensor systems and two second sensor systems.

4. The rotation angle measurement method according to claim 1, wherein the first magnetic field component runs in parallel to the rotation axis or runs at an angle of no more than 1° or no more than 0.1° with respect to the rotation axis.

5. The rotation angle measurement method according to claim 1, wherein the first type is a Hall sensor, and the first sensor system comprises at least two sensors.

6. The rotation angle measurement method according to claim 1, wherein the second type is a magnetoresistive sensor.

7. The rotation angle measurement method according to claim 1, wherein the minimization of the deviation takes place by adapting the second rotation angle in one step or in multiple steps.

8. A rotation angle measuring circuit comprising:
   a first measured value processing unit;
   a second measured value processing unit; and
   an evaluation unit,
   wherein the first measured value processing unit includes at least one input terminal for receiving at least one measured value of a first sensor system, a first rotation angle determining unit for determining a first rotation angle from the at least one measured value of the first sensor system, an output value determining unit for determining a first output rotation angle value based on the first rotation angle and a known constant angle offset between the first and a second sensor systems, and an output terminal for outputting the first output rotation angle value,
   wherein the second measured value processing unit includes at least one input terminal for receiving at least one measured value of the second sensor system, a first signal processing unit for preparing the at least one measured value, and at least one output terminal for outputting the at least one prepared measured value of the second sensor system,
   wherein the evaluation unit includes at least two input terminals for receiving the first output rotation angle value from the first measured value processing unit and the at least one prepared measured value of the second sensor system from the second measured value processing unit, at least one output terminal, a second rotation angle determining unit, a comparison unit, and a second signal processing unit,
   wherein the second signal processing unit is configured to modify or to leave unmodified the at least one prepared measured value of the second sensor system, taking a deviation into account, and to forward it as at least one further processed measured value to the second rotation angle determining unit,
   wherein the second rotation angle determining unit is configured to determine a second rotation angle value from the at least one further processed measured value of the second sensor system,
   wherein the comparison unit is configured to determine a deviation between the first output rotation angle value and the second rotation angle value and to forward the deviation to the signal processing unit, and wherein, either the at least one output terminal of the evaluation unit is configured to output the second rotation angle value or the at least one further processed measured value of the second sensor system as an end output value or the first measured value processing unit includes another output terminal for outputting the first output rotation angle value as an end output value and the at least one output terminal of the evaluation unit is configured to output the deviation or a control value ascertained by comparing the deviation with a threshold value.

9. The rotation angle measuring circuit according to claim 8, wherein the first measured value processing unit includes an analog/digital converter between each input terminal and the first rotation angle determining unit for converting the at least one measured value of the first sensor system into digital signals, the first rotation angle determining unit and the output value determining unit being configured to process digital signals.

10. The rotation angle measuring circuit according to claim 8, wherein the second measured value processing unit includes an analog/digital converter between each input terminal and the first signal processing unit for converting the at least one measured value of the second sensor system into digital signals, the second signal processing unit of the evaluation unit being configured to process digital signals.

11. The rotation angle measuring circuit according to claim 8, wherein the evaluation unit comprises:
  at least one analog/digital converter arranged between the second signal processing unit and the second rotation angle determining unit for digitizing the at least one further processed measured value; and
  a digital/analog converter arranged between the comparison unit and the second signal processing unit for converting the deviation into an analog signal,
  wherein the second rotation angle determining unit and the comparison unit and the first measured value processing unit are configured to process digital signals, and
  wherein the second signal processing unit and the first measured value processing unit are configured to process analog signals.

* * * * *